US011700110B2

(12) United States Patent
Jackson, II et al.

(10) Patent No.: US 11,700,110 B2
(45) Date of Patent: Jul. 11, 2023

(54) APPROXIMATE ALGEBRAIC OPERATIONS FOR HOMOMORPHIC ENCRYPTION

(71) Applicant: The Johns Hopkins University, Baltimore, MD (US)

(72) Inventors: Gary L. Jackson, II, Laurel, MD (US); Charles C. Schneider, Woodstock, MD (US); David R. Zaret, Columbia, MD (US); Prathibha S. Rama, Penfield, NY (US); Vivian Maloney, Columbia, MD (US); Kiel R. Gordon, Columbia, MD (US); Deanna T. Hlavacek, Eldersburg, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 17/407,410

(22) Filed: Aug. 20, 2021

(65) Prior Publication Data

US 2022/0085972 A1    Mar. 17, 2022

Related U.S. Application Data

(60) Provisional application No. 63/079,123, filed on Sep. 16, 2020.

(51) Int. Cl.
*H04L 9/00* (2022.01)
*H04L 9/30* (2006.01)

(52) U.S. Cl.
CPC ............ *H04L 9/008* (2013.01); *H04L 9/3066* (2013.01)

(58) Field of Classification Search
CPC .................. H04L 9/008; H04L 9/3066
See application file for complete search history.

(56) References Cited

U.S. PATENT DOCUMENTS

| | | | | |
|---|---|---|---|---|
| 11,165,428 | B1* | 11/2021 | Ross | H03K 19/21 |
| 11,379,611 | B1* | 7/2022 | Horesh | H04L 63/0442 |
| 2019/0334694 | A1* | 10/2019 | Chen | H04L 9/008 |
| 2020/0244435 | A1* | 7/2020 | Shpurov | H04L 9/3239 |
| 2021/0194680 | A1* | 6/2021 | Lee | H04L 9/0861 |
| 2021/0376997 | A1* | 12/2021 | Lim | H04L 9/30 |
| 2022/0029782 | A1* | 1/2022 | Cheon | H04L 9/008 |

OTHER PUBLICATIONS

Homomorphic Encryption for Arithmetic of Approximate Numbers, by Cheon et al. , publised 2017 (Year: 2017).*
Arithmetic Using Word-wise Homomorphic Encryption, by Cetin et al. , published 2015 (Year: 2015).*

* cited by examiner

*Primary Examiner* — Vu V Tran
(74) *Attorney, Agent, or Firm* — Sung T. Kim

(57) ABSTRACT

Disclosed herein are system, method, and computer program product embodiments for performing a set of operations on one or more encrypted numbers to be an approximation of performing an algebraic operation on the one or more encrypted number. A server can receive from a client, a public key of a fully homomorphic encryption scheme and one or more encrypted numbers, and perform a set of operations comprising a square root function, a rectified linear activation function (ReLU), or a multiplicative inverse function on the one or more encrypted numbers to generate an encrypted operational result. The encrypted operational result generated by the set of operations can be an approximation of performing an algebraic operation on the one or more encrypted number. The server can further transmit to the client the encrypted operational result.

20 Claims, 4 Drawing Sheets

US 11,700,110 B2

APPROXIMATE ALGEBRAIC OPERATIONS FOR HOMOMORPHIC ENCRYPTION

CROSS REFERENCE TO RELATED APPLICATIONS

The current application claims priority to U.S. Provisional Patent Application No. 63/079,123, entitled "Homomorphic Encryption and Cryptography Applied to Tactical Environments (HECATE)," filed Sep. 16, 2020, which is incorporated by reference herein in its entirety.

BACKGROUND

Encryption techniques can be applied to data, message, or plaintext that needs security protection to obtain encrypted data or ciphertext to prevent unauthorized access. Normally, in order to perform operations on ciphertext, the ciphertext is decrypted first to obtain the original plaintext, the calculations then performed on the plaintext, and the results of the calculations re-encrypted. Homomorphic encryption schemes can allow calculations or operations to be performed on the ciphertext without a need to decrypt the ciphertext first to perform the calculations on plaintext. Accordingly, homomorphic encryption schemes can allow computation on ciphertext, while preserving the correctness of the operation results. Thus data can remain confidential while it is processed, enabling useful tasks to be accomplished when data remain encrypted. However, in practice, current homomorphic encryption schemes can be considered impractical and inefficient. In particular, algebraic or arithmetic operations are expensive and introduce noise in the final decryption.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
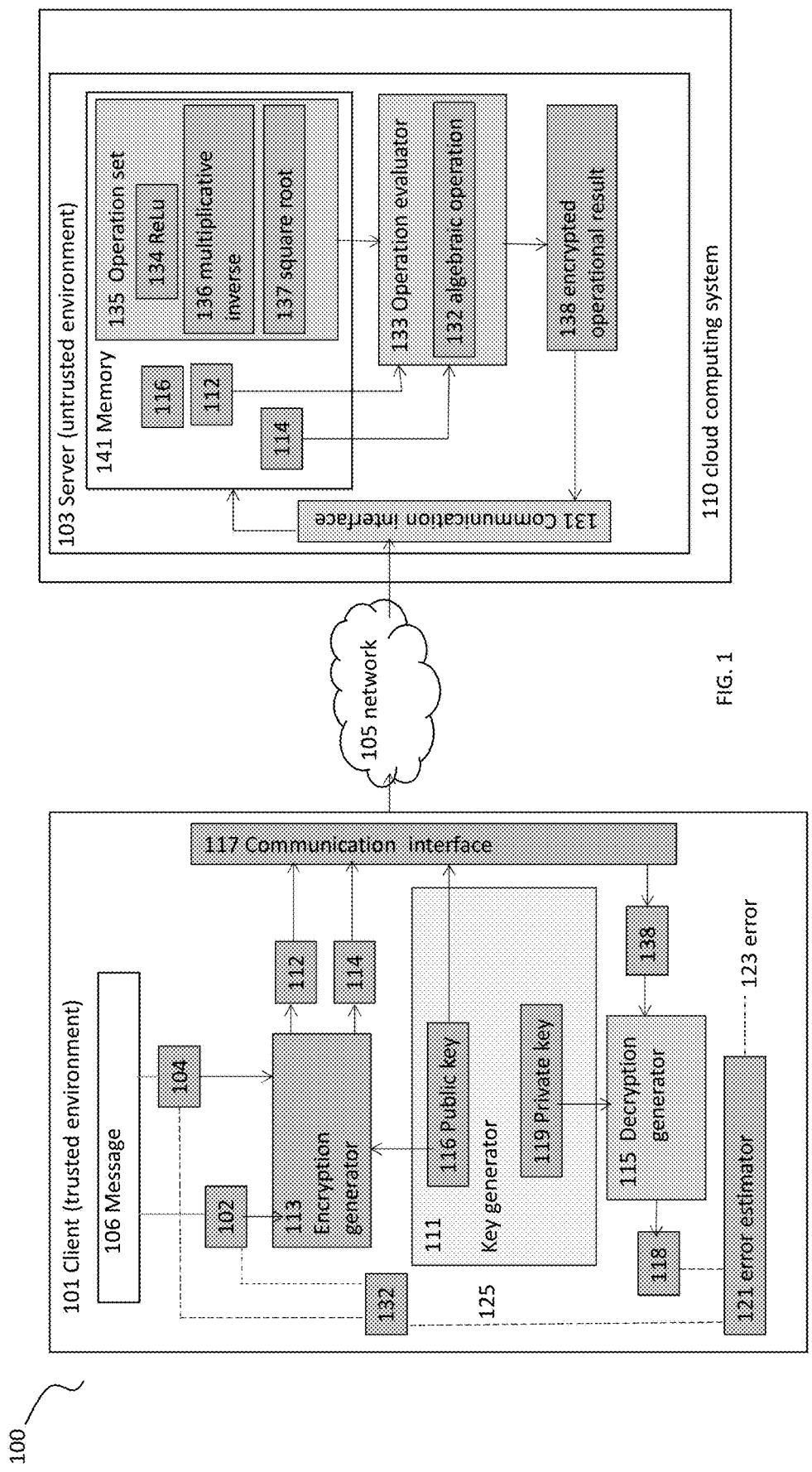
FIG. 1 is a block diagram illustrating a system for performing operations to approximate an algebraic operation on one or more encrypted numbers in a fully homomorphic encryption environment, according to some embodiments.

Homomorphic encryption is an encryption scheme that permits performing computations on encrypted data without first decrypting it. The computation results are in an encrypted form, which when decrypted obtain an output identical to that which would have been produced had the operations been performed on the unencrypted data. For example, the homomorphic property allows directly adding and multiplying two ciphertexts E(m1) and E(m2), such that the resulting value is a valid encryption of the addition or multiplication of the original plaintexts m1 and m2, e.g., E(m1)+E(m2)=E(m1+m2), and E(m1)*E(m2)=E(m1*m2).

There are various types of homomorphic encryption schemes, such as partially homomorphic encryption schemes, somewhat homomorphic encryption schemes (SHE), and fully homomorphic encryption (FHE) schemes. Partially homomorphic encryption schemes can support computations consisting of only one type of operation, e.g., addition or multiplication, to be performed on the encrypted data. SHE can support two types of operations, e.g., addition and multiplication, to be performed on the encrypted data. Furthermore, FHE can support arbitrary calculation composed of multiple types of operations to be performed on the encrypted data. In some examples, homomorphic encryption schemes support addition and multiplication of scalars on encrypted data. General arithmetic or algebraic operations can be expensive and introduce noise to the final decryption, and multiplications consume levels that can be replenished by expensive bootstrapping operations. In the current disclosure, arithmetic operations and algebraic operations are used interchangeably.

In some embodiments, approximate homomorphic encryption implements an approximate FHE scheme. For an approximate FHE scheme, the message m' decrypted by using a secret key sk can be an approximate value of the original message m encoded using a public key pk, m'=Dec(sk, Enc(pk, m))≈m. That is, decryption of an encrypted message Enc(pk, m) of message m by the secret key sk may have a form m'=Dec(sk, Enc(pk, m))=m+$e_1$(mod q), where $e_1$ is a small error inserted to guarantee the security of hardness assumptions such as the learning with errors (LWE), the ring-LWE (RLWE) and the Nth Degree Truncated Polynomial Ring Units (NTRU) problems. If $e_1$ is small enough compared to the message m, this error or noise is not likely to destroy the significant figures of m and the whole value m'=m+$e_1$ can be equivalent to the original message m and can replace the original message m in approximate arithmetic.

In some embodiments, a small error $e_2$ in the computation of encrypted data would not destroy the significant figures of m, and the whole value m'=m+$e_1$+$e_2$ can be equivalent to the original message m. The approximate homomorphic encryption may treat an error $e_2$ occurring during approximate computations as an encryption noise $e_1$ occurring during the approximate homomorphic encryption. As a result, instead of performing an algebraic operation on one or more encrypted numbers in the exact form, an approximation of the algebraic operation by a set of operations can be performed to obtain an approximation of the exact algebraic operation.

In some embodiments, homomorphic encryption for arithmetic of approximate numbers (HEAAN) is an open source homomorphic encryption library which implements an approximate FHE scheme (AFHE) proposed by Cheon, Kim, Kim and Song (CKKS). Unlike other FHE schemes, the CKKS scheme may support approximate arithmetic operations over complex numbers (hence, real numbers). In some embodiments, the CKKS scheme may be limited to algebraic operations based on homomorphic addition, multiplication, and rescaling. General arithmetic or algebraic operations can be expensive under CKKS scheme.

In some embodiments, operations to approximate arithmetic or algebraic operations for homomorphic encryption schemes can improve efficiency and accuracy. A set of operations can be performed on one or more encrypted numbers to generate an encrypted operational result, which can be an approximation of performing an algebraic operation on the one or more encrypted number. The set of operations can include a square root function, a rectified linear activation function (ReLU), or a multiplicative inverse function on the one or more encrypted numbers. The encrypted operational result can be decrypted to generate a decrypted operational result, which is equivalent to a direct operational result obtained by performing the algebraic operation on one or more corresponding unencrypted numbers, e.g., decrypted operational result=Dec(sk, encrypted operational result)≈the direct operational result. In some embodiments, the difference or error between the decrypted operational result and the direct operational result obtained by performing the algebraic operation on one or more corresponding unencrypted numbers can be small or bounded.

In some examples, the square root functions can be used to approximate the ReLU. Using the same approach as with ReLU, the square root function can be used to approximate the maximum and minimum functions. Furthermore, embodiments herein can perform the multiplicative inverse functions on positive, negative, and complex numbers as inputs, instead of only positive numbers. In addition, comparison between two encrypted numbers, along with the related operations of rounding, the sign function, the sigmoid function, can be approximated with the multiplicative inverse functions. The example operations presented in the current disclosure can be further applied for computing a variety of noteworthy mathematical functions with applications to homomorphically encrypted machine learning.

Embodiments herein further provide operations that can be performed by a fully homomorphic encryption system including a client and a server. A server can receive, from a client, a public key of a FHE scheme and one or more encrypted numbers, and perform a set of operations comprising a square root function, a ReLU, or a multiplicative inverse function on the one or more encrypted numbers to generate an encrypted operational result. The encrypted operational result generated by the set of operations can be an approximation of performing an algebraic operation on the one or more encrypted number. The server can further transmit to the client the encrypted operational result. At the client, the encrypted operational result can be decrypted using at least a private key associated with the public key of the FHE scheme to generate a decrypted operational result. The decrypted operational result generated by the client is equivalent to a direct operational result obtained by performing the algebraic operation on one or more corresponding unencrypted numbers, where the one or more encrypted numbers are generated by encrypting the one or more corresponding unencrypted numbers using the public key. An error between the decrypted operational result and the direct operational result for performing the algebraic operations on an unencrypted number x can be bounded by $$\frac{1}{x^2}(1-x^2)^{2^{n+1}} \text{ or } \frac{1}{x}(1-x^2)^{2^{n+1}},$$

or some other error bounds.

Embodiments herein can allow for evaluating polynomials and arithmetic operations on encrypted data with increased accuracy over traditional polynomial techniques. In some examples, direct evaluation of high-degree polynomials in a FHE scheme can have limited accuracy due to errors caused by many high-degree polynomial terms. Accordingly, some numerical methods, such as high-degree Chebyshev polynomial interpolation or minimax polynomials, may not be directly used in a homomorphic setting.

Embodiments herein can also be applied to data-science applications of homomorphic encryption, such as encrypted neural networks that evaluate mathematical functions other than polynomials. Those general mathematical functions can be approximated by polynomial series and iterative algorithms. Iterative algorithms can bypass the high-degree polynomials with each iteration of the approximations to the function.

Embodiments herein can provide improved technology to the HE research community, to ensure data being processed remains encrypted and hidden. For example, embodiments herein can be applicable to any sector that computes upon data that at least one party wants to remain private even when outsourced to another's server for processing. Applications can span health care data, space exploration data, government, military, and financial sector use.

FIG. 1 is a block diagram illustrating a system 100 for performing operations to approximate an algebraic operation on one or more encrypted numbers in a fully homomorphic encryption environment, according to some embodiments. In some embodiments, system 100 includes a client 101 communicatively coupled to a server 103 by a network 105. In some embodiments, server 103 can be part of a cloud computing system 110.

In some embodiments, client 101 can include an unencrypted number 102, an unencrypted number 104, a message 106, a key generator 111, an encrypted number 112, an encryption generator 113, an encrypted number 114, a decryption generator 115, a public key 116, a communication interface 117, a decrypted operational result 118, a private key 119, an error estimator 121, an error 123, a direct operational result 125, an algebraic operation 132, an encrypted operational result 138.

In some embodiments, server 103 can include a cloud computing system 110, encrypted number 112, encrypted number 114, public key 116, a communication interface 131, algebraic operation 132, operation evaluator 133, ReLU 134, operation set 135, a multiplicative inverse function 136, a square root function 137, encrypted operational result 138, and a memory 141.

In some embodiments, client 101 can include any appropriate computing device having network functionalities allowing the device to communicate with server 103. In some embodiments, client 101 can be connected to server 103 via one or more wired or wireless communications networks 105. In various embodiments, client 101 can include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, a server, an embedded device, or a similar type of device. Client 101 may include a display, and one or more applications, one or more processors, storage devices, not shown.

In some embodiments, one or more portions of network 105 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some embodiments, cloud computing system 110 includes an environment that delivers computing as a service, whereby sharing resources, services, etc. Cloud computing system 110 may provide computation, software, data access, storage, and/or other services that do not require end-user knowledge of a physical location and configuration of a system and/or a device that delivers the services. The cloud-based computing resource(s) of cloud computing system 110 can be dynamically re-allocated based on demand. The cloud-based computing resources may include one or more server farms/clusters including a collection of computer servers which can be co-located with network switches and/or routers.

In some embodiments, client 101 can include a communication interface 117 to communicate with network 105 and server 103.

In some embodiments, client 101 can also include key generator 111, encryption generator 113, and decryption generator 115, which together can form a fully homomorphic encryption scheme. In some embodiments, the security provided by a fully homomorphic encryption scheme is based on a security assumption that is often a hard computation problem. In some examples, the FHE scheme formed by key generator 111, encryption generator 113, and decryption generator 115 can be based on a learning with error (LWE) security assumption, a ring learning with errors (RLWE) security assumption, a polynomial learning with errors (PLWE) security assumption, a general learning with errors (GLWE) security assumption, or some other security assumptions known to a person of ordinary skill in the art.

In some embodiments, key generator 111 can generate public key 116, one or more secret or private keys 119 associated with public key 116, or other kind of keys such as evaluation keys. In one example, while public key 116 is used for encryption and can be shared, private key 119 is used for decryption and is kept secret to be used by decryption generator 115 to decrypt an encrypted number. Hence, decryption generator 115 can decrypt an encrypted number using private keys 119 associated with public key 116.

In some embodiments, message 106 can be encoded into one or more unencrypted numbers, e.g., unencrypted number 102 and unencrypted number 104. An error may be introduced when message 106 is encoded into one or more unencrypted number. Encryption generator 113 can receive unencrypted number 102, unencrypted number 104, some keys, such as public key 116, and generate one or more corresponding encrypted numbers, e.g., encrypted number 112 and encrypted number 114. Communication interface 117 can transmit one or more encrypted numbers, e.g., encrypted number 112 and encrypted number 114, to server 103. Communication interface 117 can also transmit public key 116 to server 103.

In some embodiments, two unencrypted numbers, unencrypted number 102 and unencrypted number 104 are used as examples. There can be more or less than two unencrypted numbers. There may be a one-to-one correspondence relationship between corresponding unencrypted numbers and encrypted numbers. Encrypted number 112 or encrypted number 114 can include a complex number or a floating number.

In some embodiments, key generator 111, encryption generator 113, and decryption generator 115 can form a CKKS related FHE scheme. The foundation of a CKKS FHE scheme can be the LWE security assumption.

In some embodiments based on a CKKS related FHE scheme, key generator 111 can generate private key 119, public key 116, and an evaluation key based on sampling a secret polynomial and modulo operations. Encryption generator 113 can use an encryption algorithm to generate a ciphertext ct based on sampling an ephemeral secret polynomial. Decryption generator 115 can generate an approximate message following decryption algorithm. For a given ciphertext ct, decryption generator 115 can output a message $m' \leftarrow \langle ct, sk \rangle \pmod{q}$. The decryption output message m' can be an approximate value of the original message, $m'=\text{Dec}(sk, \text{Enc}(pk, m)) \approx m$. Accordingly, CKKS scheme encrypts approximate values rather than exact values. When computers store real-valued data, they remember approximate values with long significant bits, not real values exactly. CKKS scheme can deal efficiently with the errors arising from the approximations. CKKS scheme can be familiar to machine learning which has inherent noises in its structure. CKKS scheme can support efficient rounding operations in encrypted data. The rounding operation can control noise increase in encrypted multiplication, which reduces the number of bootstrapping.

In some embodiments, server 103 can include communication interface 131, operation evaluator 133, and memory 141 storing operation set 135. Communication interface 131 can receive, from client 101, public key 116 of a FHE scheme and one or more encrypted numbers, e.g., encrypted number 112 and encrypted number 114, which can be saved into memory 141. Operation evaluator 133 can perform a set of operations as indicated by operation set 135. Operation set 135 can include a square root function 137, a ReLU 134, or a multiplicative inverse function 136 on the one or more encrypted numbers, e.g., encrypted number 112 and encrypted number 114, to generate an encrypted operational result 138. Operation set 135 can further include a multiplication or an addition. The encrypted operational result 138 generated by operations in operation set 135 can be an approximation of performing an algebraic operation 132 on the one or more encrypted numbers.

In some embodiments, algebraic operation 132 can include many different algebraic operations, such as a maximum operation, a minimum operation, a comparison operation, a rounding operation, a sign function, a sigmoid operation, an absolute value operation, or argmin(a, b) defined below.

In some embodiments, when algebraic operation 132 is ReLU to be performed on encrypted number x, operation set 135 can include square root, addition, and multiplicative inverse of 2, according to the formula $\text{ReLU}(x)=\max(x, 0)=\frac{1}{2}(x+\sqrt{x^2})$. In some embodiments, it is easy and straightforward to compare the plaintext number with zero to find the result of ReLU(x). In some embodiments, for the encrypted number x, since it is not known what is the value of the original number for the encrypted number x, it becomes harder to compare the encrypted number x with 0. In some embodiments, the formula $\frac{1}{2}(x+\sqrt{x^2})$ produces the same result as max(x, 0). In some embodiments, the calculation of $\frac{1}{2}(x+\sqrt{x^2})$ is only done partially by approximation based on formula $\text{ReLU}(x)=\frac{1}{2}(x+\sqrt{x^2})$ using operations including square root, addition, and multiplicative inverse of 2, and no other operations. In some embodiments, the result of ReLU(x) is only an approximation. Calculations of ReLU(x) by $\frac{1}{2}(x+\sqrt{x^2})$ can provide better accuracy than some other methods. For example, ReLU(x) can be implemented by performing the maximum function directly, which can produce less accurate result than the calculation results based on $\frac{1}{2}(x+\sqrt{x^2})$.

In some embodiments, when algebraic operation 132 is a multiplicative inverse function $$\frac{1}{x}$$

to be performed on encrypted number x, operation set 135 can include square root, addition, and multiplicative inverse of 2, and an approximation of $$\frac{1}{x}$$

can be derived according to the formula $$\frac{1}{x} = \frac{x}{x^2}.$$

When algebraic operation 132 is a multiplicative inverse function to be performed on encrypted number x, where x is a complex number, operation set 135 can include square root, addition, and multiplicative inverse of 2, and an approximation of $$\frac{1}{x}$$

can be derived according to the formula $$\frac{1}{x} = \frac{x}{x*x^*},$$

wherein x* is a complex conjugate of x. In addition, when algebraic operation 132 is an absolute value function to be performed on encrypted number x, operation set 135 can include square root and multiplication, and an approximation of |x| can be derived according to the formula $|x|=\sqrt{x^2}$.

In some embodiments, when algebraic operation 132 is argmin(a, b) defined by $$\operatorname{argmin}(a, b) = \begin{cases} 1, a < b \\ 0, a > b \end{cases},$$

operation set 135 can include square root, addition, and multiplicative inverse of 2, and an approximation of argmin (a, b) can be derived according to the formula:

$$\operatorname{argmin}(a, b) = \frac{1}{|b-a|}(b - \min(a, b)) = \frac{1}{2}\left((b-a) * \frac{1}{|a-b|} + 1\right).$$

In some embodiments, algebraic operation 132 can further include an operation selected from general linear algebra, matrix inverse, polynomial regression, multiplicative depth of HE multiplication, division, square roots, trigonometric functions, rounding/ceiling/floor. Since algebraic operation 132 can be approximated by operations within operation set 135, computation on ciphertext can be performed in a true outsourcing way so that server 103 does not decrypt and does not know the plaintext of the ciphertext.

In some embodiments, server 103 can transmit to client 101, the encrypted operational result 138. In client 101, the encrypted operational result 138 can be decrypted using at least private key 119 associated with the public key 116 to generate a decrypted operational result 118. In some embodiments, instead of a FHE scheme, algebraic operation 132 can be performed on one or more corresponding unencrypted numbers, unencrypted number 102 and unencrypted number 104, to generate a direct operational result 125. Decrypted operational result 118 can be equivalent to the direct operational result 125. In some embodiments, the direct operational result 125 can be the same as decrypted operational result 118.

Additionally and alternatively, direct operational result 125 can have an error 123 compared to decrypted operational result 118. Error 123 can be the difference between decrypted operational result 118 and direct operational result 125. Error 123 can be obtained by error estimator 121, which can detect the difference between decrypted operational result 118 and direct operational result 125. In some embodiments, error 123 between decrypted operational result 118 and the direct operational result 125 for performing the algebraic operations on an unencrypted number x, which is unencrypted number 102, can be bounded by $$\frac{1}{x^2}(1-x^2)^{2n+1}.$$

Because error between the decrypted operational result 118 and direct operational result 125 is small and bounded as indicated by $$\frac{1}{x^2}(1-x^2)^{2n+1},$$

system 100 can perform the algebraic operation 132 at server 103 on encrypted numbers without really performing algebraic operation 132 at client 101 on unencrypted number 102 and unencrypted number 104 to generate the direct operational result 125.

In some embodiments, system 100 can be used for performing operations to approximate algebraic operation 132 on one or more encrypted numbers in a fully homomorphic encryption environment, which is implemented in a specific machine. For example, client 101 can include encryption generator 113 and decryption generator 115 so that the encryption and decryption are done in client 101. In some embodiments, server 103 includes operation evaluator 133 to perform an approximation of algebraic operation 132 on encryption numbers only. In some embodiments, approximation of algebraic operation 132 is performed on encryption numbers with enhanced security. In some embodiments, the approximation of algebraic operation 132 are not arbitrary operations, instead the approximation is based on operation set 135 that includes only the square root function, the ReLU, the multiplicative inverse function, the multiplication, or the addition, without any other operations. Embodiments herein further provide techniques with increased accuracy and smaller error, which can be shown in more details in the following descriptions.

In some embodiments, system 100 can be applied to outsourcing storage and computing. Users may outsource data storage and computing to third party cloud service providers with reduced risk or exposure of their sensitive (e.g. personally identifiable information of their customers/clients) or proprietary (e.g. intellectual property or strategic intelligence) data. In some embodiments, system 100 can be applicable to a cloud system for protecting security and privacy of data in financial services, such as loan services, insurance services, or bank transactions. System 100 can be applicable to protect security and privacy of data in healthcare services and technology to protect patient data such as lab results, or history of treatments. Further application of system 100 can include blockchain and distributed computing to protect privacy of transactional information on the distributed ledger, and many other applications.

Figure 2:
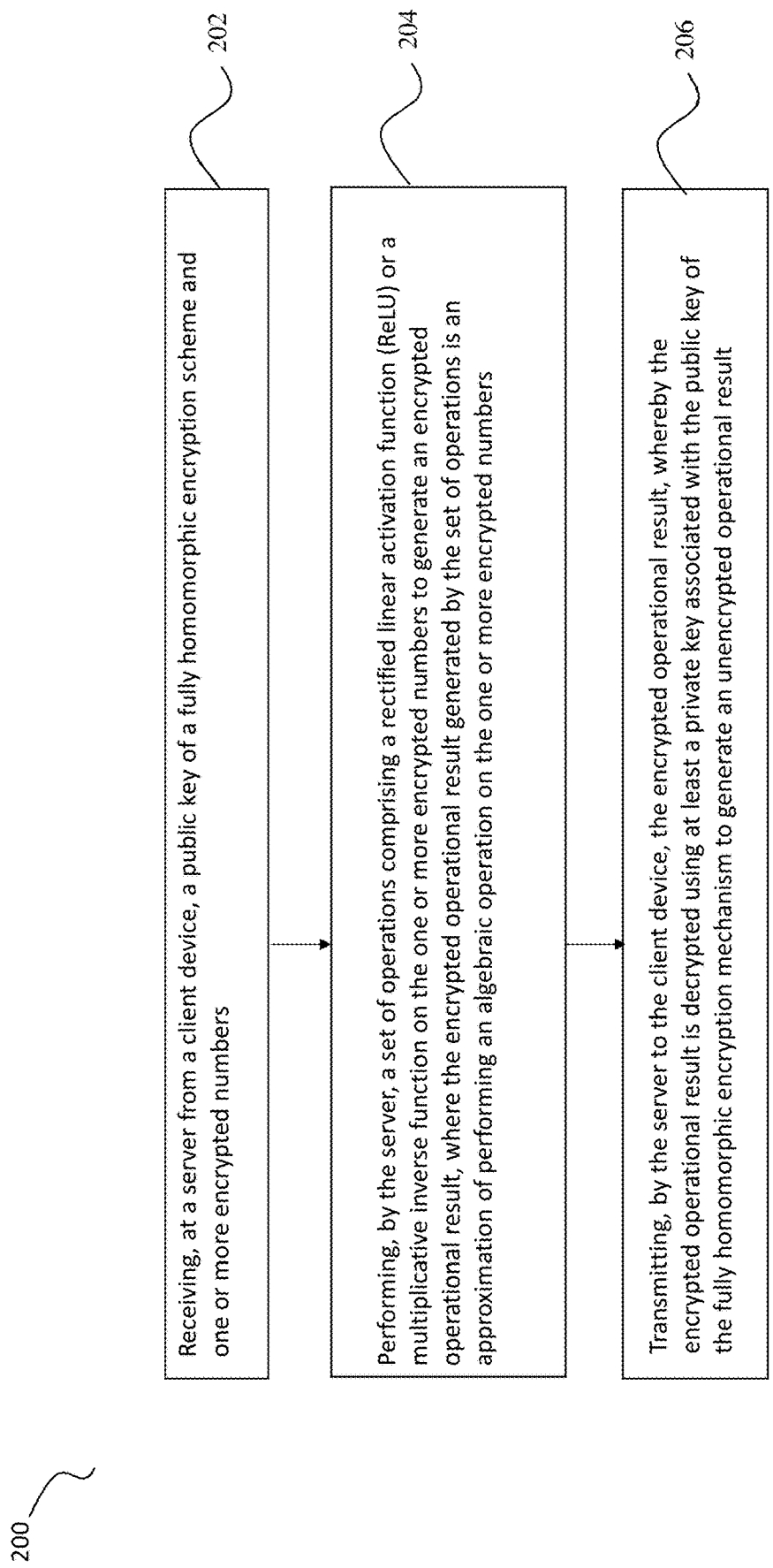
FIG. 2 is a diagram illustrating an example process for performing operations to approximate an algebraic operation on one or more encrypted numbers in a fully homomorphic encryption environment, according to some embodiments.

FIG. 2 is a diagram illustrating an example process 200 for performing operations to approximate an algebraic operation on one or more encrypted numbers in a fully homomorphic encryption environment, according to some embodiments. Process 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

At 202, a server can receive, from a client, a public key of a fully homomorphic encryption scheme and one or more encrypted numbers. For example, as shown in FIG. 1, server 103 can receive, from client 101, public key 116 and one or more encrypted numbers, e.g., encrypted number 112 and encrypted number 114.

At 204, the server can perform a set of operations including a square root function, a ReLU, or a multiplicative inverse function on the one or more encrypted numbers to generate an encrypted operational result. The encrypted operational result generated by the set of operations is an approximation of performing an algebraic operation on the one or more encrypted numbers. For example, as shown in FIG. 1, operation evaluator 133 of server 103 can perform operations included in operation set 135 that may include a square root function, a ReLU, a multiplicative inverse function, a multiplication, or an addition to generate encrypted operational result 138. Encrypted operational result 138 can be an approximation of performing algebraic operation 132 on the one or more encrypted numbers.

At 206, the server can transmit to the client the encrypted operational result, whereby the encrypted operational result is decrypted using at least a private key associated with the public key of the fully homomorphic encryption mechanism to generate a decrypted operational result. For example, as shown in FIG. 1, server 103 can transmit encrypted operational result 138 to client 101. Client 101 can decrypt encrypted operational result 138 using at least private key 119 associated with public key 116 to generate decrypted operational result 118.

In some embodiments, efficiency can be measured by two quantities: the total number of multiplications performed and the multiplicative depth of the circuit or the process. In some embodiments, the cost of addition operations is neglected because they are several orders of magnitude faster than multiplication operations. In some embodiments, the homomorphic encryption schemes are leveled, meaning that the ciphertexts can only support a finite number of sequential multiplications. For example, when the number of remaining levels reaches zero, a bootstrapping procedure can be performed to reset the level so that computation can continue. The number of levels consumed by a process can be equal to the number of sequential multiplications performed on the input ciphertext, e.g. the multiplicative depth of an arithmetic circuit for computing the algorithm. As such, more operations can be performed before needing to bootstrap if the algorithms have a low multiplicative depth. In some examples, a set of operations are limited to be multiplicative inverse functions, square roots, ReLU, multiplications, or additions to generate an encrypted operational result as an approximation of performing an algebraic operation. For example, no other operations may be used except multiplicative inverse functions, square roots, ReLU, multiplications, or additions can be used to approximate an algebraic operation.

In some embodiments, the multiplicative inverse function $1/x$ can be computed based on Goldschmidt's iterative inverse algorithm, whose description and initial analysis are generally known to a person of ordinary skill of the art. Goldschmidt's iterative inverse algorithm converges for complex numbers inside a ball of radius 1 in the complex plane centered at 1+0i. In practice, this algorithm may only be applicable to division by positive numbers in the range (0, 2), but not negative numbers. The algorithm may not be used for inputs outside of this radius, such as negative numbers, because it diverges. In an unencrypted setting, the algorithm can check whether the number it is attempting to invert is positive or negative ahead of time, and if the input is negative then the algorithm can instead compute the result via $$\frac{1}{x} = -\frac{1}{-x},$$

which only involves taking the inverse of a positive number. In some examples, this approach may be applied in a homomorphic encryption setting if the sign of the divisor is known ahead of time. In some embodiments, the sign of the input is not known in advance meaning a workaround may not be applied in the context of homomorphic encryption, as conditional branching depending on encrypted values is not directly possible.

In some embodiments, the inverse algorithm can be extended to work when the input is larger than the range (0, 2), by rescaling the input and output values. This can be similar to the operations used to have the inverse algorithm work for negative numbers, $$\frac{1}{x} = c \cdot \frac{1}{x \cdot c}.$$

In some embodiments, each iteration of Goldschmidt's algorithm performs two multiplications, except for the first, totaling $2(n-1)$ multiplications. The multiplicative depth may be equal to the number of iterations, although if the input values have an upper bound not equal to 1, the algorithm may use two more levels to scale and rescale the input and output. In one example, if the input is in the range $x \in [2^{-m}, 1]$ and the multiplicative error rate is to be below $<2^{-a}$, then it performs $n > m + \log_2(a)$ iterations. The efficiency of Goldschmidt's multiplicative inverse algorithm is summarized in Table 1.

TABLE 1

Efficiency of Goldschmidt's multiplicative inverse algorithm

| | |
|---|---|
| number of iterations | N |
| multiplicative depth | N |
| total multiplications | 2(n − 1) |
| error bound | $\frac{1}{x}(1-x)^{2^{n+1}}$ |

In some embodiments, the expanded multiplicative inverse function can be computed by expanding the Goldschmidt multiplicative inverse algorithm to converge for both positive and negative inputs by composing the square and inverse functions. First the square of the input can be produced as a positive value, which will be inside the radius of converge of Goldschmidt's algorithm. Afterwards, the output of Goldschmidt's and the original input are multiplied. This example can bypass the restriction that Goldschmidt's algorithm is unable to divide by a potentially negative number $$\frac{1}{x} = \frac{x}{x^2}.$$

For complex numbers, the $$"\frac{x}{x^2} = \frac{1}{x}"$$

formula should be replaced by $$"\frac{x}{xx^*} = \frac{1}{x}",$$

where x* is the complex conjugate.

In some embodiments, the expanded multiplicative inverse performs two more multiplications than the base algorithm, totaling 2n multiplications with a depth of n+2. For example, if the absolute value of the input is within the range $|x| \in |2^{-m}, 1|$ and the multiplicative error rate is below $<2^{-a}$, then it performs $n > 2m + \log_2(a)$ iterations. In some embodiments, compared to Goldschmidt's original multiplicative inverse, the expanded version performs m more iterations to achieve the same accuracy for the same bound on the absolute value of the input, but works for both positive and negative (and complex) input values. The efficiency of expanded multiplicative inverse algorithm is summarized in Table 2.

TABLE 2

Efficiency of expanded multiplicative inverse algorithm

| | |
|---|---|
| number of iterations | N |
| multiplicative depth | n + 2 |
| total multiplications | 2n |
| error bound | $\frac{1}{x^2}(1-x^2)^{2^{n+1}}$ |

In some embodiments, the square root function can be computed using the two-variable iterative method generally known to a person of ordinary skill of the art. This method converges for $0 < x < 3$, and converges best for x close to 1, but as with multiplicative inverse, scaling the input to the correct range is simple if an accurate upper-bound can be given $\sqrt{x} = \sqrt{1/c} \cdot \sqrt{x \cdot c}$.

In some embodiments, each iteration of the square root algorithm performs five multiplications, except for the final iteration, which performs only two multiplications, totaling 5n−3 multiplications. The multiplicative depth of the method is two levels per iteration, plus two levels if the input and output must be scaled into the radius of convergence. The efficiency of square root algorithm is summarized in Table 3.

TABLE 3

Efficiency of square root algorithm

| | |
|---|---|
| number of iterations | n |
| multiplicative depth | 2n |
| total multiplications | 5n − 3 |
| error bound | $\sqrt{x}\left(1-\frac{x}{4}\right)^{2^{n+1}}$ |

In some embodiments, the absolute value function can be computed by the composition of the square function and the square root function. For values within the range $(-\sqrt{3}, \sqrt{3})$, the square function maps the value to (0, 3), which is within the valid input range for the previous square root algorithm. Hence, the square root function can be used to calculate (with appropriate upper bounds) the absolute value via $|x| = \sqrt{x^2}$ and $$\left|\frac{x}{c}\right| = \sqrt{\left(x \cdot \frac{1}{c}\right)^2}.$$

In some embodiments, the absolute value function performs one more multiplication than the square root function, totaling 5n−2 multiplications for n square root iterations. The multiplicative depth is also one more than the square root, giving 2n+1. The efficiency of absolute value algorithm is summarized in Table 4.

TABLE 4

Efficiency of absolute value algorithm

| | |
|---|---|
| number of iterations | n |
| multiplicative depth | 2n + 1 |
| total multiplications | 5n − 2 |
| error bound | $|x|\left(1-\frac{x^2}{4}\right)^{2^{n+1}}$ |

In some embodiments, the ReLU function can be computed by using the identity $ReLU(x)=\frac{1}{2}(x+|x|)$, and the identity $|x|=\sqrt{x^2}$. This can be part of a family of noteworthy functions which can all be computed in terms of the absolute value function $ReLU(x)=\frac{1}{2}(x+|x|)$, $\min(a, b)=\frac{1}{2}((a+b)-|a-b|)$, and $\max(a, b)=\frac{1}{2}((a+b)+|a-b|)$.

In some embodiments, the error bound of ReLU is directly related to the error bound of the absolute value approximation, which was previously shown to be $$\left|x\right|\left(1-\frac{x^2}{4}\right)^{2^{n+1}}.$$

Since the result of the absolute value is divided by two, the final error bound is $$\frac{|x|}{2}\left(1-\frac{x^2}{4}\right)^{2^{n+1}}.$$

These error bounds can also directly apply to the maximum and minimum functions, replacing x with (a–b). This analysis holds for x in the range [−1,1]. In addition, this range can be extended at the cost of one additional multiplication by rescaling the input and output according to the identity $$ReLU(x) = c \cdot ReLU\left(\frac{1}{c} \cdot x\right).$$

The efficiency of ReLU algorithm is summarized in Table 5.

TABLE 5

| Efficiency of ReLU algorithm | |
|---|---|
| number of iterations | N |
| multiplicative depth | 2(n + 1) |
| total multiplications | 5n − 1 |
| error bound | $\frac{|x|}{2}\left(1-\frac{x^2}{4}\right)^{2^{n+1}}$ |

In some embodiments, the comparison, rounding, and sign function can be computed by the following approaches. The single-argument sign function can be defined as $$\text{sign}(x) = \begin{cases} -1 & x < 0 \\ +1 & x > 0 \end{cases}.$$

The single-argument step function can be defined as step $$(x) = \begin{cases} 0 & x < 0 \\ 1 & x > 0 \end{cases}.$$

The single-argument round function can be defined as round $$(x) = \begin{cases} 0 & x < 0.5 \\ 1 & x > 0.5 \end{cases}.$$

The two-argument argmin or comparison function can be defined as argmin $$(a, b) = \begin{cases} 1 & a < b \\ 0 & a > b \end{cases}.$$

All of these functions can be computed in terms of each other. For example, one could use the following formulas for computations and approximation:

step(x)=0.5·(sign(x)+1);

round(x)=step(x−0.5)=0.5·(sign(x−0.5)+1);

argmin(a,b)=step(b−a);

argmax(a,b)=1−argmin(a,b).

In some embodiments, as with the multiplicative inverse and square root functions the algorithms for homomorphically evaluating these functions are valid over a certain range of inputs, but the input can be rescaled to that range if an upper and lower bound for the input is known ahead of time. The sign function can be computed using the identity $$\text{sign}(x) = \frac{x}{|x|},$$

and then using the preceding algorithms for multiplicative inverse and absolute value.

In some embodiments, there is an additional consideration regarding parameter choice for the computation of the approximation of an algebraic operation. For example, the previous algorithms are parameterized by a single positive integer: the number of iterations. Increasing the number of iterations can decrease the error across the entire input range. But with the algorithm for the sign function, increasing the number of iterations $n_{inv}$ for the multiplicative inverse subroutine while leaving the number of iterations $n_{abs}$ for the absolute value subroutine constant can actually decrease the total accuracy of the algorithm by causing it to overshoot ±1 for inputs near zero. This overshoot can additionally imply that the algorithm does not monotonically transition from −1 to 1. In some embodiments, this overshoot phenomena is demonstrated graphically in FIGS. 3A-3B.

Figure 3B:
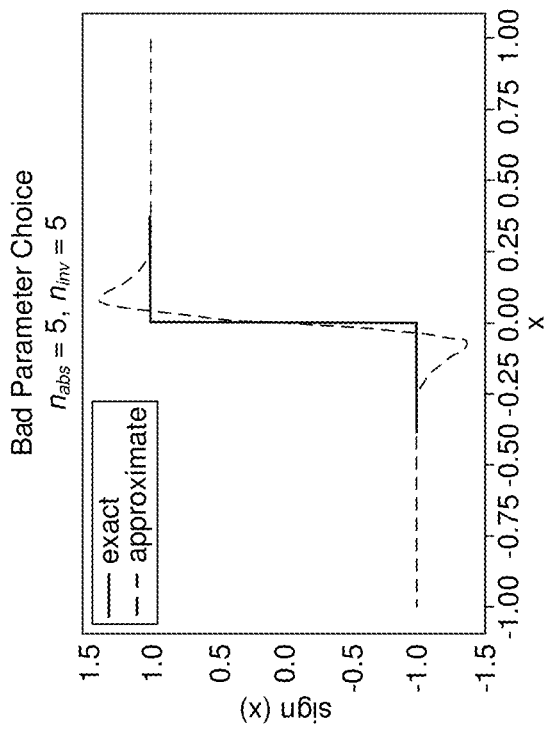
FIGS. 3A and 3B illustrate example parameter choices for performing operations to approximate an algebraic operation on one or more encrypted numbers in a fully homomorphic encryption environment, according to some embodiments.
Figure 3A:
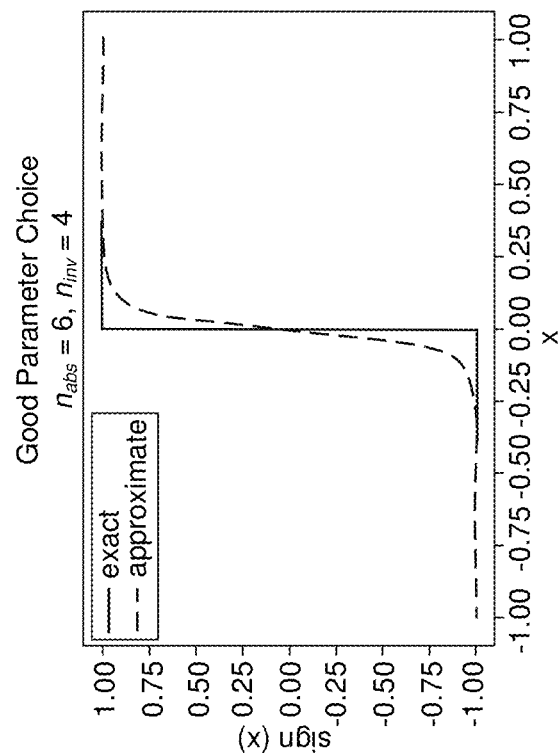

FIG. 3A illustrates an exemplary embodiment showing a good parameter choice, where the function monotonically transitions from −1 to 1. FIG. 3B illustrates an exemplary embodiment showing a bad parameter choice, where the function overshoots ±1 when the input is near zero. In some embodiments, heuristic analysis of the overshoot problem is shown.

The following describes an exemplary embodiment without limitation.

Lemma: The approximate absolute value function scales as $x^2$ for x near zero.

Proof: The square root algorithm is a finite polynomial series in x, which takes value 0 at x=0. The absolute value algorithm evaluates this series at input $x^2$, producing a finite polynomial series with even powers of x, where the constant term vanishes.

The error in the square root algorithm and hence the absolute value algorithm is negative, i.e. $abs(x; n_{abs}) \le |x|$ for all $x \in (-\sqrt{3}, \sqrt{3})$. For each $n_{abs}$, there is some maximum error e>0 such that $|x|-abs(x; n_{abs}) < e$ for all $x \in (-\sqrt{3}, \sqrt{3})$. Then, the approximate absolute value function is bounded by $|x|-e < abs(x; n_{abs}) \le |x|$.

Putting these two together, an upper bound for the approximate sign function is obtained as $$x \min\left(\frac{1}{|x|-e}, 2^{n_{inv}}\right).$$

This upper bound switches from linear scaling $x \cdot 2^{n_{inv}}$ for inputs near zero to reciprocal scaling as $$\frac{x}{|x|-e}$$

for inputs near the maximum error location of the approximate absolute value function. The overshoot occurs when $2^{-n_{inv}} < |x| < 2^{-n_{inv}} + e$. This explains why increasing the number of multiplicative inverse iterations while holding the number of absolute value iterations fixed makes the overshoot worse: the peak of the linear regime goes to $e \cdot 2^{n_{inv}}$, where e depends on $n_{abs}$.

Computing the argmin function requires $3+5n_{abs}+2n_{inv}$ multiplications, with a depth of $3+2n_{abs}+n_{inv}$. Embodiments herein can have improved accuracy (for a fixed multiplicative depth) and range of convergence compared to other known argmin algorithm.

In some embodiments, the parameter settings in Table 6 are recommended to avoid overshoot and provide a high level of accuracy and efficiency. The number of absolute value iterations $n_{abs}$ in each row is (usually) the smallest number of iterations which prevents overshoot for the specified number of multiplicative inverse iterations $n_{inv}$. For the rows with $n_{inv}=5, 8$, there is a small but negligible amount of overshoot present.

Table 6 below also reports the accuracy in terms of the $L_1$/mean absolute error (MAE) and the $L_2$/root mean square error (RMSE) across the input range [−1, 1]. The $L_\infty$/maximum absolute error (AE) is not shown because the sign function is discontinuous, so the $L_\infty$ error is not representative of accuracy for our continuous approximations.

TABLE 6

Efficiency of approximate sign algorithm

| $n_{inv}$ | $n_{abs}$ | multiplicative depth | total multiplications | MAE | RMSE | avoids overshoot |
|---|---|---|---|---|---|---|
| 2 | 3 | 11 | 22 | 0.1751 | 0.3109 | ✓ |
| 3 | 4 | 14 | 29 | 0.0841 | 0.2170 | ✓ |
| 4 | 6 | 19 | 41 | 0.0482 | 0.1570 | ✓ |
| 5 | 7 | 22 | 48 | 0.0200 | 0.1078 | |
| 6 | 9 | 27 | 60 | 0.0114 | 0.0773 | ✓ |
| 7 | 11 | 32 | 72 | 0.0062 | 0.0556 | ✓ |
| 8 | 12 | 35 | 79 | 0.0025 | 0.0380 | |

In some embodiments, the sigmoid function (aka logistic function) is commonly used in machine learning applications. It smoothly monotonically transitions from 0 to 1, and then saturates at the value $$\sigma(x) = \frac{1}{1+e^{-x}}.$$

For the settings of the parameters in Table 6, the resulting sign function is numerically very close to the sigmoid function, after rescaling and shifting both the input and output values $$\sigma(x) \approx \text{step}\left(\frac{1}{c} \cdot x; n_{abs}, n_{inv}\right) = 0.5 \cdot \left(\text{sign}\left(\frac{1}{c} \cdot x; n_{abs}, n_{inv}\right) + 1\right).$$

The parameter settings in Table 7 provide a high level of accuracy and efficiency across a wide range of values $x \in [-c, +c]$. A larger value of c means that the sigmoid approximation has a larger valid input range. The accuracy in terms of the $L_1$/mean absolute error (MAE) and the $L_2$/root mean square error (RMSE) and the $L_\infty$/maximum absolute error (AE) across the input range [−c, +c] are shown in Table 7.

For machine learning applications include deep learning and logistic regression, the ($n_{inv}=3$, $n_{abs}=4$) and ($n_{inv}=4$, $n_{abs}=6$) parameter settings may be used for their balance between high accuracy, low multiplicative depth, and wide input range.

TABLE 7

Efficiency of approximate sigmoid algorithm

| $n_{inv}$ | $n_{abs}$ | input range c | multiplicative depth | total multiplications | MAE | RMSE | AE |
|---|---|---|---|---|---|---|---|
| 2 | 3 | 7.9473 | 13 | 24 | 0.0017 | 0.0021 | 0.0044 |
| 3 | 4 | 16.6598 | 16 | 31 | 0.0015 | 0.0023 | 0.0055 |
| 4 | 6 | 30.6118 | 21 | 43 | 0.0023 | 0.0048 | 0.0149 |
| 5 | 7 | 68.8605 | 24 | 50 | 0.0009 | 0.0026 | 0.0125 |
| 6 | 9 | 129.2733 | 29 | 62 | 0.0004 | 0.0017 | 0.0102 |
| 7 | 11 | 243.0138 | 34 | 74 | 0.0004 | 0.0022 | 0.0181 |
| 8 | 12 | 557.1956 | 37 | 81 | 0.0001 | 0.0011 | 0.0157 |

Figure 4:
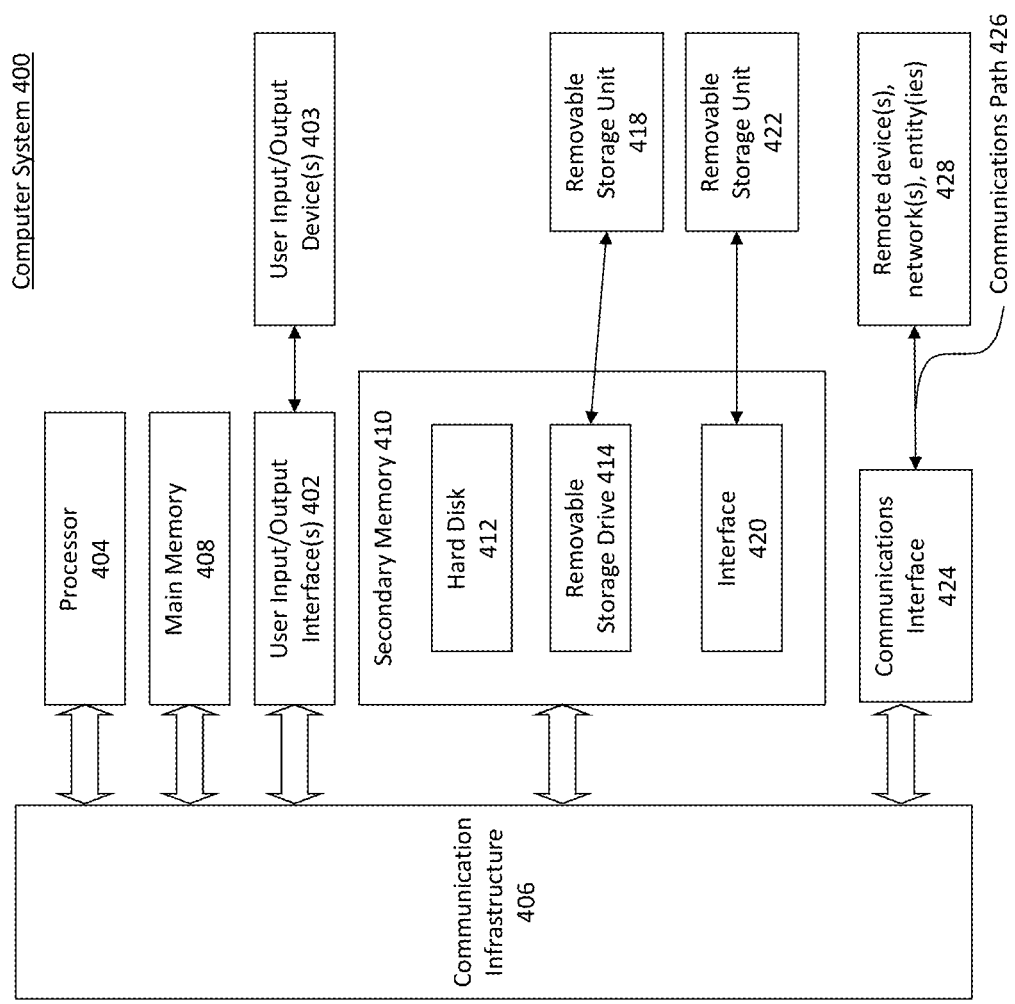
FIG. 4 is an example computer system useful for implementing various embodiments.

Various embodiments can be implemented, for example, using one or more computer systems, such as computer system 400 shown in FIG. 4. Computer system 400 can be used, for example, to implement processes 200 of FIG. 2. For example, computer system 400 can implement and execute a set of instructions comprising operations to approximate an algebraic operation on one or more encrypted numbers in a fully homomorphic encryption environment, as shown in FIGS. 1-2, such as operations performed by client 101 or server 103. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
receiving, at a server from a client, a public key of a fully homomorphic encryption scheme and one or more encrypted numbers generated by encrypting one or more corresponding unencrypted numbers using the public key;
performing, by the server, a set of operations comprising a square root function, a rectified linear activation function (ReLU), or a multiplicative inverse function on the one or more encrypted numbers to generate an encrypted operational result, wherein the encrypted operational result generated by the set of operations is an approximation of performing an algebraic operation on the one or more encrypted numbers, wherein an algebraic operation ReLU has an approximation obtained by a set of operations including a square root, a multiplicative inverse of 2, and an addition; and
transmitting, by the server to the client, the encrypted operational result, whereby the encrypted operational result is decrypted using at least a private key associated with the public key of the fully homomorphic encryption mechanism to generate a decrypted operational result.

2. The method of claim 1, wherein:
the decrypted operational result is equivalent to a direct operational result obtained by performing the algebraic operation on the one or more corresponding unencrypted numbers.

3. The method of claim 2, wherein an error between the decrypted operational result and the direct operational result for performing the algebraic operations on an unencrypted number x is bounded by $$\frac{1}{x^2}(1-x^2)^{2^{n+1}} \text{ or } \frac{1}{x}(1-x^2)^{2^{n+1}},$$

wherein n is a number of iterations performed to calculate the multiplicative inverse function.

4. The method of claim 2, further comprising generating the one or more encrypted numbers by encrypting the one or more corresponding unencrypted numbers using the public key.

5. The method of claim 1, further comprising applying a formula to determine the ReLU of an encrypted number x, the formula comprising:

$$ReLU(x)=\max(x, 0)=\tfrac{1}{2}(x+\sqrt{x^2}).$$

6. The method of claim 1, further comprising applying a formula to determine the multiplicative inverse function of an encrypted number x, the formula comprising:

$$\frac{1}{x} = \frac{x}{x^2}.$$

7. The method of claim 1, further comprising using a complex number or a floating number as an encrypted number of the one or more encrypted numbers.

8. The method of claim 1, further comprising:
using a complex number x as an encrypted number of the one or more encrypted numbers, and
determining a multiplicative inverse function of the complex number x by applying a formula $$\frac{1}{x} = \frac{x}{x*x^*},$$

wherein $x^*$ is a complex conjugate of x.

9. The method of claim 1, wherein:
the algebraic operation comprises a maximum operation, a minimum operation, a comparison operation, an rounding operation, a sign function, a sigmoid operation, an absolute value operation, or argmin(a, b), and argmin(a, b) is defined by argmin $$\operatorname{argmin}(a, b) = \begin{cases} 1, a < b \\ 0, a > b \end{cases}$$

that is calculated by:

$$\operatorname{argmin}(a, b) = \frac{1}{|b-a|}(b - \min(a, b)) = \frac{1}{2}\left((b-a) * \frac{1}{|a-b|} + 1\right).$$

10. The method of claim 1, wherein the set of operations further comprises a multiplication or an addition.

11. The method of claim 1, wherein the fully homomorphic encryption scheme is based on a ring learning with errors (RLWE) security assumption, a polynomial learning with errors (PLWE) security assumption, or a general learning with errors (GLWE) security assumption.

12. A computing device, comprising:
- a memory configured to store a public key of a fully homomorphic encryption scheme and a set of operations, wherein the set of operations includes a square root function, a rectified linear activation function (ReLU), or a multiplicative inverse function; and
- a processor, communicatively coupled to the memory, configured to:
  - receive, from a client, the public key, and one or more encrypted numbers generated by encrypting one or more corresponding unencrypted numbers using the public key;
  - perform the set of operations on the one or more encrypted numbers to generate an encrypted operational result, wherein the encrypted operational result generated by the set of operations is an approximation of performing an algebraic operation on the one or more encrypted number, wherein an algebraic operation ReLU has an approximation obtained by a set of operations including a square root, a multiplicative inverse of 2, and an addition; and
  - transmit, to the client, the encrypted operational result, whereby the encrypted operational result is decrypted using at least a private key associated with the public key of the fully homomorphic encryption scheme to generate a decrypted operational result.

13. The computing device of claim 12, wherein the decrypted operational result is equivalent to a direct operational result obtained by performing the algebraic operation on the one or more corresponding unencrypted numbers.

14. The computing device of claim 13, wherein an error between the decrypted operational result and the direct operational result for performing the algebraic operations on an unencrypted number x is bounded by $$\frac{1}{x^2}(1-x^2)^{2^{n+1}} \text{ or } \frac{1}{x}(1-x^2)^{2^{n+1}},$$

wherein n is a number of iterations performed to calculate the multiplicative inverse function.

15. The computing device of claim 12, wherein the processor is further configured to apply a formula to determine the ReLU of an encrypted number x, the formula comprising:

$ReLU(x) = \max(x, 0) = \frac{1}{2}(x + \sqrt{x^2})$.

16. The computing device of claim 12, wherein the processor is further configured to apply a formula to determine the multiplicative inverse function of an encrypted number x, the formula comprising:

$$\frac{1}{x} = \frac{x}{x^2}.$$

17. The computing device of claim 12, wherein the processor is further configured to use a complex number or a floating number as an encrypted number of the one or more encrypted numbers.

18. The computing device of claim 12, wherein the algebraic operation comprises a maximum operation, a minimum operation, a comparison operation, an rounding operation, a sign function, a sigmoid operation, an absolute value operation, or argmin(a, b), and argmin(a, b) is defined by $$\operatorname{argmin}(a, b) = \begin{cases} 1, a < b \\ 0, a > b \end{cases}$$

that is calculated by:

$$\operatorname{argmin}(a, b) = \frac{1}{|b-a|}(b - \min(a, b)) = \frac{1}{2}\left((b-a) * \frac{1}{|a-b|} + 1\right).$$

19. A non-transitory computer-readable medium having instructions stored thereon that, when executed by a computing device, cause the computing device to perform operations comprising:
- receiving, from a client, a public key of a fully homomorphic encryption scheme and one or more encrypted numbers generated by encrypting one or more corresponding unencrypted numbers using the public key;
- performing a set of operations comprising a square root function, a rectified linear activation function (ReLU), or a multiplicative inverse function on the one or more encrypted numbers to generate an encrypted operational result, wherein the encrypted operational result generated by the set of operations is an approximation of performing an algebraic operation on the one or more encrypted number, wherein an algebraic operation ReLU has an approximation obtained by a set of operations including a square root, a multiplicative inverse of 2, and an addition; and
- transmitting to the client, the encrypted operational result, whereby the encrypted operational result is decrypted using at least a private key associated with the public key of the fully homomorphic encryption mechanism to generate a decrypted operational result.

20. The non-transitory computer-readable medium of claim 19, wherein an error between the decrypted operational result and a direct operational result for performing the algebraic operations on an unencrypted number x is bounded by $$\frac{1}{x^2}(1-x^2)^{2^{n+1}} \text{ or } \frac{1}{x}(1-x^2)^{2^{n+1}},$$

wherein n is a number of iterations performed to calculate the multiplicative inverse function.

* * * * *